US011475222B2

(12) United States Patent
Beller et al.

(10) Patent No.: US 11,475,222 B2
(45) Date of Patent: Oct. 18, 2022

(54) AUTOMATICALLY EXTENDING A DOMAIN TAXONOMY TO THE LEVEL OF GRANULARITY PRESENT IN GLOSSARIES IN DOCUMENTS

(71) Applicant: INTERNATIONAL BUSINESS MACHINES CORPORATION, Armonk, NY (US)

(72) Inventors: Charles E. Beller, Baltimore, MD (US); Andrew Doyle, Mount Rainier, MD (US); Edward G. Katz, Washington, DC (US); Alexander C. Tonetti, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 16/797,430

(22) Filed: Feb. 21, 2020

(65) Prior Publication Data

US 2021/0264113 A1    Aug. 26, 2021

(51) Int. Cl.
*G06F 16/35* (2019.01)
*G06F 40/289* (2020.01)
(Continued)

(52) U.S. Cl.
CPC .......... *G06F 40/289* (2020.01); *G06F 40/253* (2020.01); *G06F 40/30* (2020.01); *G06N 3/006* (2013.01)

(58) Field of Classification Search
CPC ...... G06F 40/289; G06F 40/253; G06F 40/30; G06F 16/95; G06F 16/285; G06F 16/367;
(Continued)

(56) References Cited

U.S. PATENT DOCUMENTS 8,589,791 B2   11/2013   Caldwell et al.
9,043,265 B2    5/2015   Michelin
(Continued)

FOREIGN PATENT DOCUMENTS

WO    2009143395 A1    11/2009
WO    201535932          3/2015

OTHER PUBLICATIONS

Muchemi et al., "Rapid Induction of Multiple Taxonomies for Enhanced Faceted Text Browsing", International Journal of Artificial Intelligence and Applications (IJAIA), vol. 7, No. 4, Jul. 2016, 13 pages.

(Continued)

Primary Examiner — Jakieda R Jackson
(74) Attorney, Agent, or Firm — Edward P. Li

(57) ABSTRACT

A controller accesses an initial taxonomy for a domain comprising one or more existing terms for the domain identified in a hierarchical structure. The controller analyzes a corpus documents for a domain to identify a selection of one or more documents with glossaries. The controller extracts, from the glossaries, one or more pairs each comprising a term and a definition. The controller attempts to map a respective term of each of the one or more pairs into the initial taxonomy for the domain based on text of a respective definition of each of the one or more pairs to generate an updated taxonomy for the domain.

16 Claims, 11 Drawing Sheets

(51) Int. Cl.
  *G06F 40/30* (2020.01)
  *G06F 40/253* (2020.01)
  *G06N 3/00* (2006.01)

(58) Field of Classification Search
  CPC ..... G06F 16/9027; G06F 16/35; G06N 3/006; G10L 15/22; G10L 2015/088; G06Q 30/0255
  See application file for complete search history.

(56) References Cited

U.S. PATENT DOCUMENTS

| | | | |
|---|---|---|---|
| 9,081,785 | B2 | 7/2015 | Mandelstein et al. |
| 9,275,062 | B2 | 3/2016 | Janssen et al. |
| 9,530,228 | B1 | 12/2016 | Fermum et al. |
| 9,665,568 | B2 | 5/2017 | Gerard et al. |
| 10,013,641 | B2 | 7/2018 | Helfman et al. |
| 10,169,423 | B2 | 1/2019 | Bhatia et al. |
| 10,170,014 | B2 | 1/2019 | Beason et al. |
| 10,402,491 | B2 * | 9/2019 | Hosabettu ............... G06F 17/27 |
| 2006/0026204 | A1 | 2/2006 | Campbell |
| 2007/0282780 | A1 | 12/2007 | Regier |
| 2011/0137921 | A1 | 6/2011 | Inagaki |
| 2013/0086076 | A1 | 4/2013 | Pandit et al. |
| 2013/0260358 | A1 * | 10/2013 | Lorge et al. ............. G09B 7/00 434/362 |
| 2015/0088910 | A1 | 3/2015 | Misra |
| 2016/0103885 | A1 | 4/2016 | Lee et al. |
| 2016/0132486 | A1 | 5/2016 | Hauser et al. |
| 2016/0203498 | A1 * | 7/2016 | Das et al. .............. G06Q 30/02 |
| 2016/0292149 | A1 | 10/2016 | Mote |
| 2017/0004208 | A1 * | 1/2017 | Podder et al. .......... G06F 17/30 |
| 2017/0075877 | A1 | 3/2017 | Lepeltier |
| 2017/0169359 | A1 | 6/2017 | Chernis et al. |
| 2018/0025061 | A1 | 1/2018 | Dantressangle et al. |
| 2018/0107654 | A1 | 4/2018 | Jung |
| 2018/0365323 | A1 * | 12/2018 | Doornenbal et al. ... G06F 17/30 |
| 2019/0179949 | A1 | 6/2019 | Gerstl et al. |
| 2020/0257761 | A1 | 8/2020 | Bull |
| 2021/0117509 | A1 * | 4/2021 | Aditya et al. ....... G06F 17/2785 |
| 2021/0382946 | A1 | 12/2021 | Beller |

OTHER PUBLICATIONS

Hovy et al., "Extending Metadata Definitions by Automatically Extracting and Organizing Glossary", Proceedings of the 2003 Annual National Conference on Digital Government Research, Jan. 2003, 6 pages.

Westerhout, Eline, "Definition Extraction using Linguistic and Structural Features", WDE '09: Proceedings of the 1st Workshop on Definition Extraction, Sep. 2009, 7 pages.

Arora et al., "Automated Extraction And Clustering Of Requirements Glossary Terms", Luxembourg, printed on Feb. 1, 2022, 30 pages.

Gemkow et al., "Automatic Glossary Term Extraction From Large-Scale Requirements Specifications", © 2018 IEEE, 7 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages. Dec. 12, 2012.

IBM Appendix P, "List of patents and patent applications to be treated as related", Filed Herewith, 2 pages.

IBM, "Journal of Research and Development", This is Watson, Introduction and Table of Contents, vol. 56, No. 3/4, May/Jul. 2012, 5 pages, <http://ieeexplore.IEEE.org/xpl/tocresult.jsp?reload=true&isnumber=6177717>.

Navigli et al., "GlossExtractor: A Web Application To Automatically Create A Domain Glossary", R. Basili and M.T. Pazienza (Eds.): AI*IA 2007, LNAI 4733, pp. 339-349, 2007, © Springer-Verlag Berlin Heidelberg 2007, 11 pages.

Velardi et al., "Mining The Web To Create specialized Glossaries", vol. 23, No. 5, IEEE Intelligent Systems, Sep./Oct. 2008, 9 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

AUTOMATICALLY EXTENDING A DOMAIN TAXONOMY TO THE LEVEL OF GRANULARITY PRESENT IN GLOSSARIES IN DOCUMENTS

BACKGROUND

1. Technical Field

One or more embodiments of the invention relate generally to data processing and particularly to automatically extending a domain taxonomy to the level of granularity present in glossaries in documents of a domain corpus.

2. Description of the Related Art

Cognitive computing refers to a computing service that processes and analyzes large data sets, in a corpus, to provide computerized models that support services that simulate the functioning of the human cognition process and helps with decision-making.

BRIEF SUMMARY

In one embodiment, a method is directed to accessing, by a computer, an initial taxonomy for a domain comprising one or more existing terms for the domain identified in a hierarchical structure. The method is directed to analyzing, by the computer, a corpus of a plurality of documents for a domain to identify a selection of one or more documents with glossaries. The method is directed to extracting, by the computer, from the glossaries, one or more pairs each comprising a term and a definition. The method is directed to attempting to map, by the computer, a respective term of each of the one or more pairs into the initial taxonomy for the domain based on text of a respective definition of each of the one or more pairs to generate an updated taxonomy for the domain.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to access an initial taxonomy for a domain comprising one or more existing terms for the domain identified in a hierarchical structure. The stored program instructions comprise program instructions to analyze a corpus of a plurality of documents for a domain to identify a selection of one or more documents with glossaries. The stored program instructions comprise program instructions to extract, from the glossaries, one or more pairs each comprising a term and a definition. The stored program instructions comprise program instructions to attempt to map a respective term of each of the one or more pairs into the initial taxonomy for the domain based on text of a respective definition of each of the one or more pairs to generate an updated taxonomy for the domain.

In another embodiment, a computer program product comprises a computer readable storage medium having program instructions embodied therewith, wherein the computer readable storage medium is not a transitory signal per se. The program instructions are executable by a computer to cause the computer to access, by a computer, an initial taxonomy for a domain comprising one or more existing terms for the domain identified in a hierarchical structure. The program instructions are executable by a computer to cause the computer to analyze, by the computer, a corpus of a plurality of documents for a domain to identify a selection of one or more documents with glossaries. The program instructions are executable by a computer to cause the computer to extract, by the computer, from the glossaries, one or more pairs each comprising a term and a definition. The program instructions are executable by a computer to cause the computer to attempt to map, by the computer, a respective term of each of the one or more pairs into the initial taxonomy for the domain based on text of a respective definition of each of the one or more pairs to generate an updated taxonomy for the domain.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
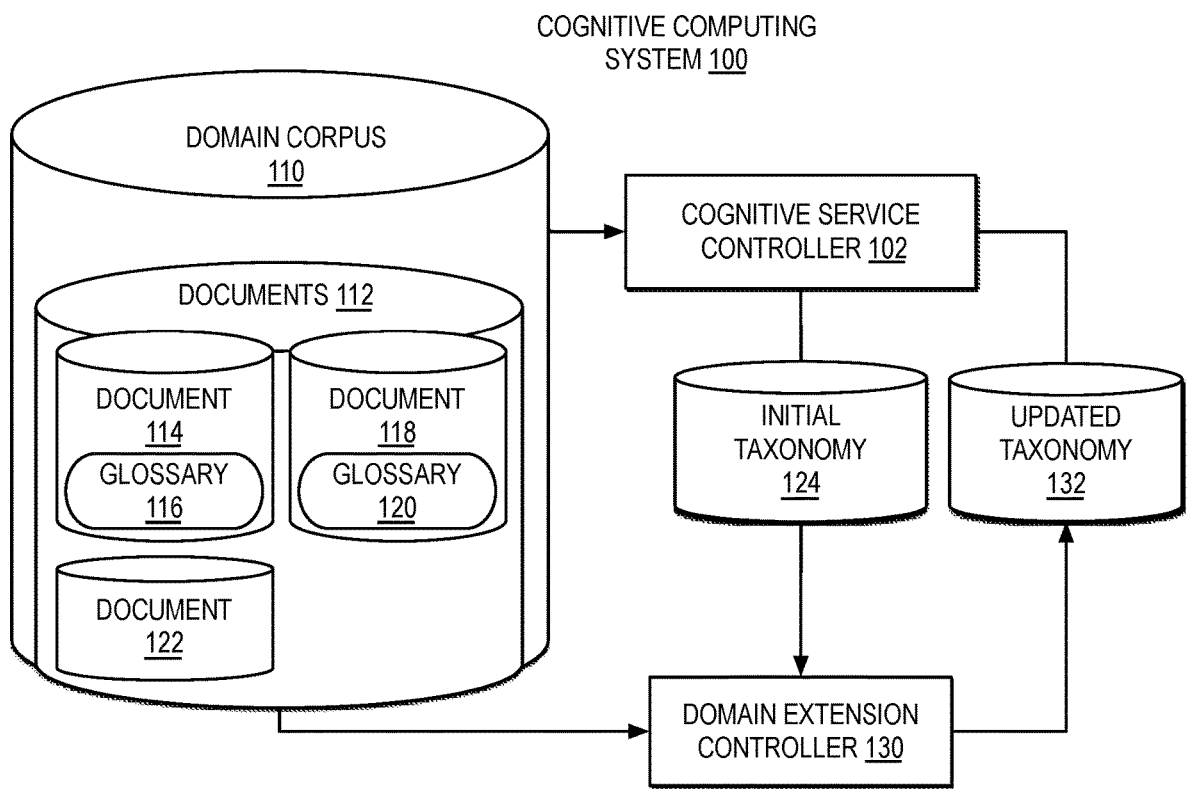
FIG. 1 illustrates one example of a block diagram of a cognitive computing system for efficiently extending a domain taxonomy to the level of granularity present in glossaries available in documents of a domain corpus.

FIG. 1 illustrates one example of a block diagram of a cognitive computing system for efficiently extending a domain taxonomy to the level of granularity present in glossaries available in documents of a domain corpus.

In one example, a cognitive computing system 100 implements a cognitive service controller 102, which provides one or more cognitive services based on computerized models that simulate the human cognition process. Applications of cognitive service controller 102 may include artificial intelligence services, such as expert systems, neural networks, robotics and virtual reality, in addition to cognitive services based on self-learning technologies that synthesize data from one or more information sources, while also weighing context and conflicting evidence, including, but not limited to, data mining, pattern recognition, and natural language processing to mimic cognitive processes of a human brain.

In one example, to facilitate efficient deep text analysis and other types of cognitive system analysis for a domain by a cognitive service controller 102, cognitive service controller 102 accesses a taxonomy that includes a classification of groups of terms relevant to a domain. In one example, a domain refers to a category or topic, which incorporates multiple subcategories or subtopics. In one example, the presence of a taxonomy supports rule-based and statistical annotation analysis by cognitive service controller 102, and may influence cognitive decisions at multiple levels including, but not limited to, parsing, entity extraction, and answer generation.

In one example, an initial taxonomy 124 represents a collection of entries of terms collected in a structure indicating the grouping and hierarchy of the terms in a domain, applicable for one or more cognitive applications. As the lexical resources available for a domain change, the effectiveness of cognitive system 100 in accurately providing cognitive analysis necessitates updating taxonomies to reflect the domain changes, as an updating of initial taxonomy 124. In the example, both the building of initial taxonomy 124 and the updating to generate updated taxonomy 132, when manually performed, incurs significant costs of time and financial expense and are prone to human error. According to an advantage of the present invention, a domain extension controller 130 minimizes the time, financial expense, and error proneness of generating updated taxonomy 132 by automatically extending the entries in initial taxonomy 124, to generate updated taxonomy 132, based on the level of granularity present in terms and definitions within glossary elements of documents in a domain corpus 110.

In one example, domain corpus 110 includes multiple documents, illustrated by documents 112, relevant to a domain. In the example, documents 112 may include structured and unstructured text and may be collected from one or more sources. In one example, domain corpus 110 represents data, or a collection of data, used in linguistics and language progressing. In general, domain corpus 110 includes large volumes of data stored electronically.

In one example, for natural language processing (NLP) services provided by cognitive service controller 102, such as services that support NLP based question answering systems, the performance of the NLP service is impacted by the type and levels of analysis performed by the NLP service on the source of information provided by domain corpus 110, including a volume of passages of data. In one example, NLP services apply annotators that review domain corpus 110 and annotate the documents with a label, such that the document are then recognizable by a machine for use as a dataset in machine learning for building NLP models used in question answering systems. In one example, NLP services may apply one or more types of annotators, including rule-based annotators and statistical annotators, that apply rules or statistics to documents 112 in domain corpus 110 to automate document annotation. In one example, for NLP systems annotating large volumes of documents associated with a website to support NLP based question answering, lexical resources provide support to annotators to automated decisions at multiple cognitive system levels including, but not limited to, influencing parsing, entity extraction and answer generation. In one example, the presence of a term in a lexicon or taxonomy may influence the types of decisions automatically made when parsing, extracting entities, or generating answers from domain corpus 110. In one example, a lexical resource may represent a database including one or more dictionaries, in one or more formats. For example, lexical resources associated with a domain may include, but are not limited to, word lists, lexicons, and taxonomies. In one example, a domain's taxonomy represents the way the domain organizes its data into categories and subcategories, sometimes displayed in a site map. In one embodiment, a volume of documents 112 within domain corpus 110 includes a volume of documents of a level sufficient for providing a basis for cognitive learning by a computer system to enable the computer system to efficiently analyze requests for information, such as searches, related to the domain with a level of expertise exceeding an expected accuracy threshold.

In one example, one or more individual documents within documents 112 include one or more glossary entries. For example, document 114 of documents 112 includes a glossary 116 and document 118 of documents 112 includes a glossary 120. In the example, document 122 of documents 112 does not include a glossary entry. In additional or alternate embodiments, documents 112 may include additional or alternate documents with and without glossaries. In one example, a glossary is an alphabetical list of terms in a particular domain of knowledge with the definitions for those terms. For example, technical domains may include documents with glossaries that include information that a human would use to construct a mental analog of what a cognitive system applies as a lexical resource.

In one example, a glossary element with a document refers to information in the document that specifies a term and a corresponding definition of the term. In one example, glossary elements within documents 112 may include, but are not limited to, elements in a section marked by a header such as "glossary", "definition", or other glossary identifier. For example, documents 112 may include a corpus of technical manuals, each comprising one or more structured or semi-structured glossary sections. In another example, glossary elements within documents 112 may include, but are not limited to, elements structured in a manner indicative of definitions of terms.

In one example, domain extension controller 130 accesses domain corpus 110 and initial taxonomy 124. In one example, initial taxonomy 124 represents one or more entries with collections of words classified into hierarchical groups. In one example, once initial taxonomy 124 is created, domain extension controller 130 automatically manages the adaptation of initial taxonomy 124 to reflect a particular domain by building out gaps in initial taxonomy 124 to reflect the granularity of concepts present in glossaries in documents of domain corpus, generating an updated taxonomy 132 for application by cognitive service controller 102.

In the example, according to an advantage of the present invention, domain extension controller 130 manages extending initial taxonomy 124 to an updated taxonomy 132 at the level of granularity present in glossaries available in documents of a domain. Updated taxonomy 132 may be applied by a cognitive system to support deep text analysis and other types of searches. In one example, the presence of a term in updated taxonomy 132 may influence decisions at multiple levels including, but not limited to, parsing entity extraction, and answer generation. According to an advantage of the present invention, by automating the extension of initial taxonomy 124 to reflect the granularity of concepts present in document corpus 110, domain extension controller 130 efficiently, cost effectively, and accurately automates the identification of terms from glossaries in document corpus 110 for identifying gaps or missing taxonomy concepts in initial taxonomy 124 and building out updated taxonomy 132. Further, in additional or alternate embodiments, in addition to domain extension controller 130 generating updated taxonomy 132 to reflect the level of granularity present in glossaries available in documents of a domain, domain extension controller 130 may also evaluate the distribution of words within all the documents in the domain, however, according to an advantage of the present invention, by focusing on glossaries in document corpus 110 for building out updated taxonomy 132, domain extension controller 130 is not required to spend the bandwidth evaluating all the text in the documents of document corpus 110.

Figure 2:
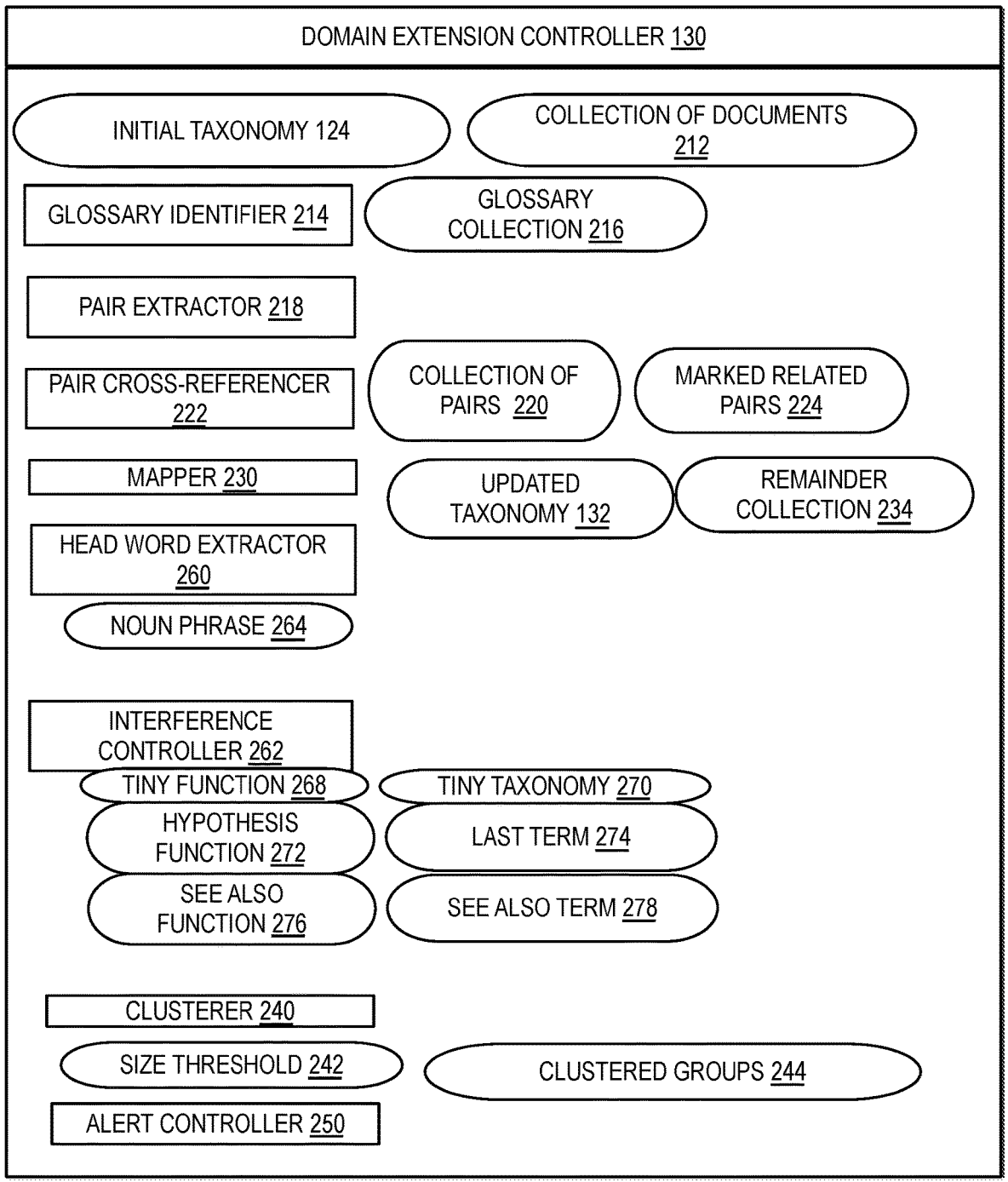
FIG. 2 illustrates one example of a block diagram of a domain extension controller for efficiently extending a domain taxonomy to the level of granularity present in glossaries in documents in a domain corpus.

FIG. 2 illustrates a block diagram of one example of a domain extension controller for efficiently extending a domain taxonomy to the level of granularity present in glossaries in documents in a domain corpus.

In one example, domain extension controller 130 receives initial taxonomy 124 and accesses a collection of documents 212 from within documents 112. In one example, collection of documents 212 includes documents that include glossaries and may also include one or more documents that do not include a glossary.

In one example, a glossary identifier 214 of domain extension controller 130 searches collection of documents 212 to identify each glossary section if present within each document, and collects the identified glossary sections in a glossary collection 216. In one example, glossary identifier 214 may identify a glossary section within a document by searching for a section of a document with a heading of "glossary", "definitions", or other heading word indicating a section of definitions assigned to terms. In another example, glossary identifier 214 may identify a glossary section within a document by searching for textual indicators of a term followed by a definition, such as, but not limited to, column or header styled text followed by a sentence in a regular style format, indicative of a glossary or definition entry. In another example, glossary identifier 214 may identify a glossary section within a document by first applying a parser using a grammar defined on the basis of patterns observed in the definitions and second applying machine learning to improve the initial results.

In the example, a pair extractor 218 evaluates each entry in each glossary within glossary collection 216 to extract a term and gloss pair, also described as a <term, gloss> pair. In one example, pair extractor 218 extracts a term and gloss by parsing a regular expression based on punctuation, such as a colon or dash, or formatting, such as bold or italicized text, to identify a term and a gloss.

Pair extractor 218 generates a collection of pairs 220 from the extracted <term, gloss> pair for each entry within each glossary identified in glossary collection 216. In one example, each <term, gloss> pair includes a term identified in a glossary in glossary collection 216 and a respective definition identified in association with the term in the glossary in glossary collection 216.

In the example, a pair cross-referencer 222 reviews collection of pairs 220 and marks a selection of pairs that are related in marked related pairs 224. In one example, pair cross-referencer 222 marks pairs with a same term or same gloss as related in marked related pairs 224.

In the example, for each <term, gloss> pair in collection of pairs 220, a mapper 230 attempts to map each term in the pair to the current taxonomy, starting with initial taxonomy 124, based on the text associated with the pair gloss and any identified cross-references. Mapper 230 generates updated taxonomy 132 of the mapped terms from the <term, gloss> pairs and a remainder collection 234 of the unsuccessfully mapped <term, gloss> pairs from collection of pairs 220. In the example, mapper 230 performs additional mapping iterations, attempting next to map each term in the pair in remainder collection 234 to the current taxonomy of updated taxonomy 132, based on the text associated with the pair gloss, until no further mappings can be made or a set number of iterations is reached.

In one example, in attempting to map each term in a pair to the current taxonomy, mapper 230 applies a head word extractor 260. In the example, head word extractor 260 extracts a noun phrase 264 from the text of a current entry gloss using a parsing function. A noun phrase may represent words that function as the heads of noun phrases and consist of a noun or pronoun plus any determiners, modifiers, and other components.

In the example, head word extractor 260 compares noun phrase 264 with the entries in the current taxonomy. If head word extractor 260 identifies noun phrase 264 within the entries in the current taxonomy, mapper 230 maps the term paired with the gloss of the current entry to the current taxonomy.

If head word extractor 260 does not identify noun phrase 264 within the entries in the current taxonomy, mapper 230 triggers an interference controller 262 to perform additional analysis to attempt to map each term in the pair of the current entry to the current taxonomy. In one example, interference controller 262 may apply one or more functions, sequentially or conditionally, and proceeding to additional functions only if earlier functions are not successful. In another example, interference controller 262 may combine the one or more functions with or without weighting.

For example, in a first function illustrated by tiny function 268, interference controller 262 looks up the type name in collection of pairs 220 to determine if noun phrase 264 is present in the terms of collection of pairs 220. If interference controller 262 identifies noun phrase 264 in the terms of collection of pairs 220, interference controller 262 builds an unanchored tiny taxonomy 270 with the current entry term as a child node and the other matching glossary entry term as a parent node in the hierarchy. If interference controller 262 is able to successfully map the parent entry term to the current taxonomy, then mapper 230 maps the entirety of tiny taxonomy 270 to the current taxonomy.

In one example, in a second function illustrated by hypothesis function 272, interference controller 362 identifies the last term of noun phrase 264 as a last term 274. Hypothesis function 272 hypothesizes that last term 274 of noun phrase 264 matches the type name and searches the current taxonomy to see if last term 274 is an entry. If interference controller 262 matches last term 274 to the current taxonomy, then mapper 230 maps the term in of the current entry to the current taxonomy as a child node of last word 274 in the hierarchy of the current taxonomy.

In one example, in a third function illustrated by see also function 276, interference controller 262 identifies whether an associate see also term is present in the gloss as see also term 278. In one example, see also function 276 searches the glosses in collection of pairs 220 for the text "see also" or synonyms of "see also" and identifies see also term 278 from the term following the text "see also" or synonyms of "see also". If see also term 278 is present, interference controller 262 treats the entry with a term matching see also 278 term as a synonymous entry and attempts to map the <term, gloss> pair with the term matching see also term 278. Mapper 230 may map the term from the <term, gloss> pair including see also term 278 and see also term 278 to the same node if mapping is successful.

In one embodiment, interference controller 262 applies the combined functions with or without weighting by building search indices over glossary entries and over existing terms in the taxonomy. Interference controller 262 then implements the tiny function 268, hypothesis function 272, and see also function 276 as a search query along with defined precedence order for ranking the results, as a confidence threshold C.

Interference controller 262 identifies the highest ranking taxonomy type from the best matching result to be the taxonomy type of the <term>, provided that the search confidence of the result exceeds confidence threshold C. In one example, confidence threshold C may be set restrictively high on early iterations to favor high precision mappings, and on subsequent iterations, as the taxonomy grows, confidence threshold C may be lowered to result in higher recall.

In the example, a clusterer 240 manages clustering of any unmapped <term, gloss> pairs in remainder collection 234, based on the text of the glosses, into groups of semantically similar terms in clustered groups 244. In one example, clusterer 240 may use k-means or other clustering methods, such as hierarchical clustering, for generating clustered groups 244. For each cluster in clustered groups 244, clusterer 240 may provide suggested candidate concept labels by extracting the top N terms out of each cluster, identifying which of the top terms match best, and creating a category out of the best matching terms to apply as a concept label.

In the example, an alert controller 250 compares clustered groups 244 against a size threshold 242. In the example, if alert controller 250 detects that one or more clusters in clustered groups 244 exceed size threshold 242, alert controller 250 issues an alert that a pertinent domain concept is missing from updated taxonomy 132. In one example, alert controller 250 issues alerts to a user, who may be registered as a subject matter expert, to add a concept identified in cluster groups 244 to updated taxonomy 132 and present the cluster of glossary entries in clustered groups 244 along with candidate concept labels. In one example, alert controller 250 may also attempt to automatically add a concept to updated taxonomy 132 if the clusters in clustered group 244 are sufficiently large or distinctive according to size threshold 242.

Figure 3:
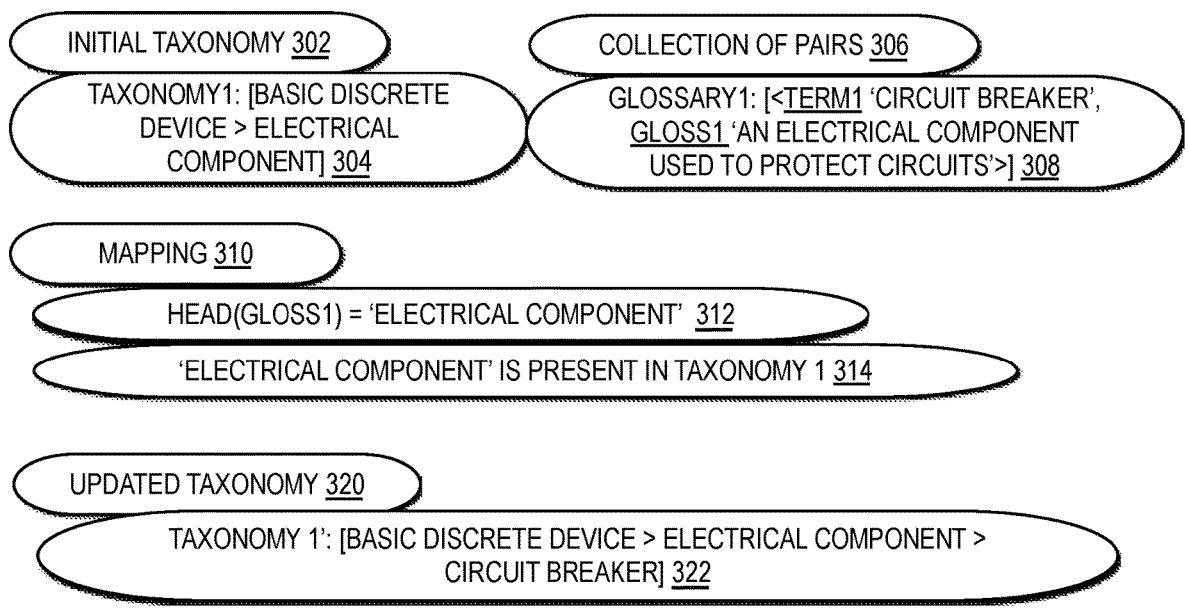
FIG. 3 illustrates one example of a block diagram of a domain extension controller efficiently extending a domain taxonomy based on a head noun phrase extracted from a sentence within a glossary in a document corpus of the domain.

FIG. 3 illustrates a block diagram of one example of a domain extension controller efficiently extending a domain taxonomy based on a head noun phrase extracted from a sentence within a glossary in a document corpus of the domain.

In the example, an initial, existing taxonomy 302 includes a taxonomy1 304 with an entry of "basic discrete device>electrical component". In one example, taxonomy entries include a top level categorical term, followed by levels of subcategories in a group, separated by an ">" indicator. In other examples, taxonomy entries may include addition or alternate types of structures and indicators for identifying different levels of a domain entry.

In the example, pair extractor 218 reviews glossaries in a glossary collection identified from a domain corpus and collects a collection of pairs 306 with a <term, gloss> pair from a glossary1 308 of a document of "<term1 'circuit breaker', gloss1 'an electrical component used to protect circuits'>". In the example, "term1" is a definition term and "gloss1" is the label for the definition extracted from a glossary identified as glossary1 308 in a document within multiple documents of a document corpus.

In the example, mapper 230 performs multiple mapping functions illustrated by mapping 310. As illustrated at reference numeral 312, head word extractor 260 searches "gloss1" of "an electrical component used to protect circuits" in collection of pairs 306 and extracts a noun phrase of "electrical component", to identify a "head(gloss1)" of "electrical component". As illustrated at reference numeral 314, head word extractor 260 identifies that the "head (gloss1)" of "electrical component" is present in taxonomy1 304 as "electrical component". In response to identifying "head(gloss1)" of "electrical component" present in taxonomy1 304, mapper 230 adds "term1" of "circuit breaker", which is paired with "gloss 1" in collection of pairs 306 to taxonomy1 304 to generate an updated taxonomy 320 of taxonomy1' 322 with an entry "basic discrete device>electrical component>circuit breaker", indicating "circuit breaker" is a subcategory of "electrical component" based on the glossary definition of "circuit breaker".

In the example, by automatically determining that "circuit breaker" is a subcategory of an existing entry in taxonomy1 304, domain extension controller 130 efficiently extends initial taxonomy 302 based on extracting a noun phrase from a glossary definition within a document of a document corpus and identifying the noun phrase as matching an existing term in taxonomy1 304, to automatically extend the granularity available in a glossary definition into updated taxonomy 320, without requiring an evaluation of each word within a glossary definition with each existing term in taxonomy1 304.

Figure 4:
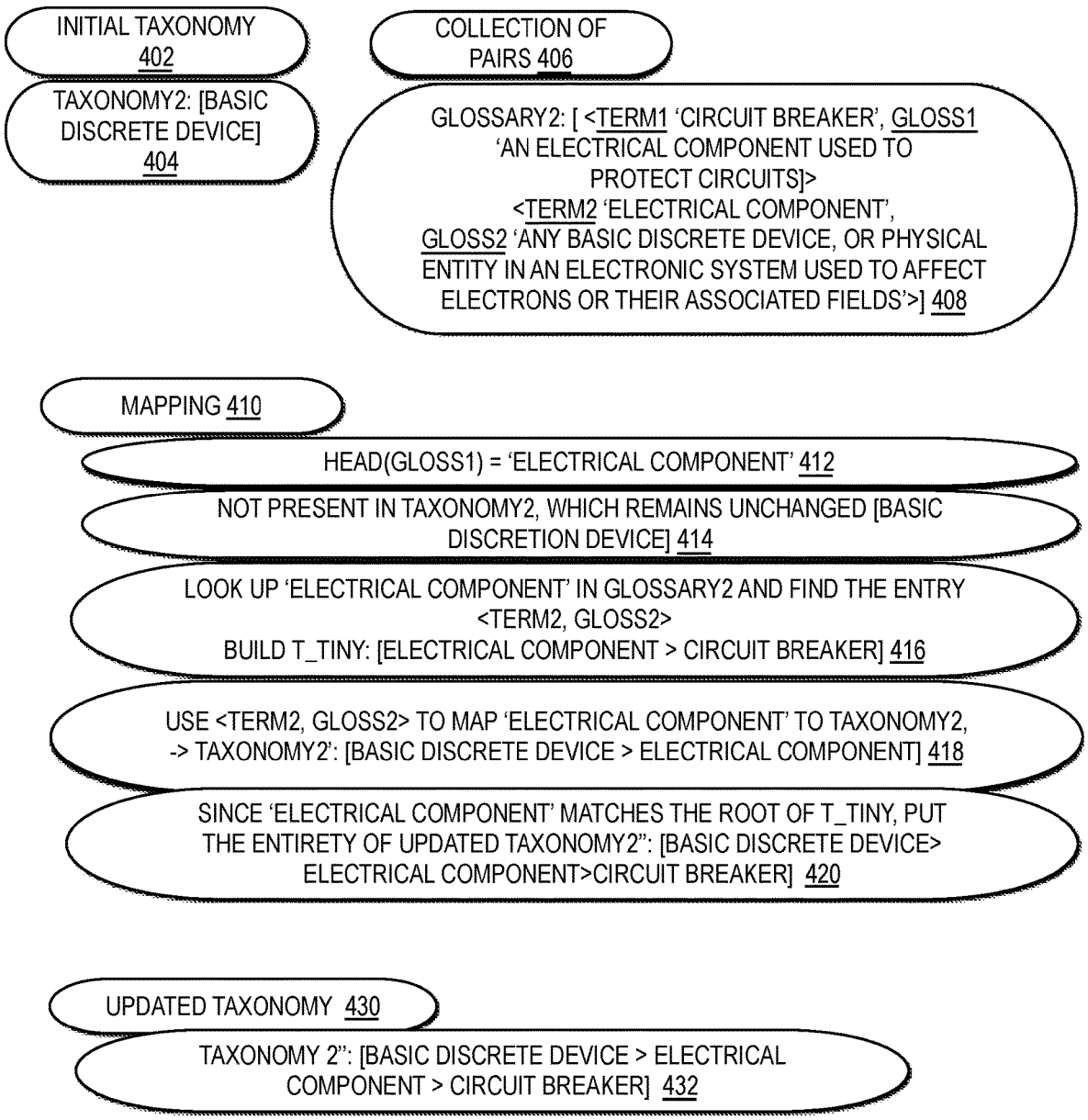
FIG. 4 illustrates one example of a block diagram of a domain extension controller efficiently extending a domain taxonomy based on analyzing a type name in a sentence within a glossary in a document corpus of the domain.

FIG. 4 illustrates a block diagram of one example of a domain extension controller efficiently extending a domain taxonomy based on analyzing a type name in a sentence within a glossary in a document corpus of the domain.

In the example, an existing, initial taxonomy 402 includes a taxonomy2 404 with an entry of "basic discrete device". In the example, pair extractor 218 reviews glossaries within documents in a corpus and collects a collection of pairs 406 with multiple <term, gloss> pairs from a glossary2 408 of a document of "<term1 'circuit breaker', gloss1 'an electrical component used to protect circuits>'" and "<term2 'electrical component', gloss2 'any basic discrete device, or physical entity in an electronic system used to affect electrons or their associated fields'>". In the example, multiple terms and definitions are identified in a single glossary entry within a document of a document corpus.

In the example, mapper 230 performs multiple mapping functions illustrated by mapping 410. First, as illustrated at reference numeral 412, head word extractor 260 searches "gloss1 'an electrical component used to protect circuits'" in collection of pairs 406 and extracts a noun phrase of "electrical component", to identify a "head(gloss1)" of "electrical component". As illustrated at reference numeral 414, head word extractor 260 identifies that the "head (gloss1)" of "electrical component" is not present in taxonomy2 404, so taxonomy2 404 remains unchanged. In response to identifying that head(gloss1) of "electrical component" is not present in taxonomy2 404, interference controller 262 initiates tiny function 268 to look up the noun phrase of 'electrical component' in glossary2 408 to determine if the phrase is in the current glossary. In response to tiny function 268 identifying the noun phrase of 'electrical component' in entry <term2,gloss2> of glossary2 408, tiny function 268 builds a tiny taxonomy with the matching entry as a child node and the noun phrase as a parent node, as illustrated by "build T_tiny: [electrical component>circuit breaker]" at reference numeral 416.

Next, as illustrated at reference numeral 418, mapper 230 recalls head word extractor 260 to extract a noun phrase from "gloss2" of "basic discrete device". Since "basic discrete device" is present in taxonomy2 404, mapper 230 maps "term2" of "electrical component" to taxonomy2 404, resulting in an updated taxonomy iteration of taxonomy2' within an entry "basic discrete device>electrical component", as illustrated at reference numeral 418. In the example, as illustrated at reference numeral 420, since mapped term "electrical component" also matches the root of the tiny taxonomy, mapper 230 puts the entirety of the tiny taxonomy in an additional updated taxonomy iteration of taxonomy2", with the entry updated to "basic discrete device>electrical component>circuit breaker". In the example, the final updated taxonomy iteration is stored in updated taxonomy 430 is taxonomy2" 432 with entry updated to "basic discrete device>electrical component>circuit breaker".

In the example, by automatically generating a tiny taxonomy identifying that that "circuit breaker" is a subcategory of a noun phrase of "electrical component" and mapping the tiny taxonomy to the current taxonomy, domain extension controller 130 efficiently extends initial taxonomy 402 based on a glossary definition into updated taxonomy 420, without requiring an evaluation of each word within a glossary definition with each existing term in glossary2 408.

Figure 5:
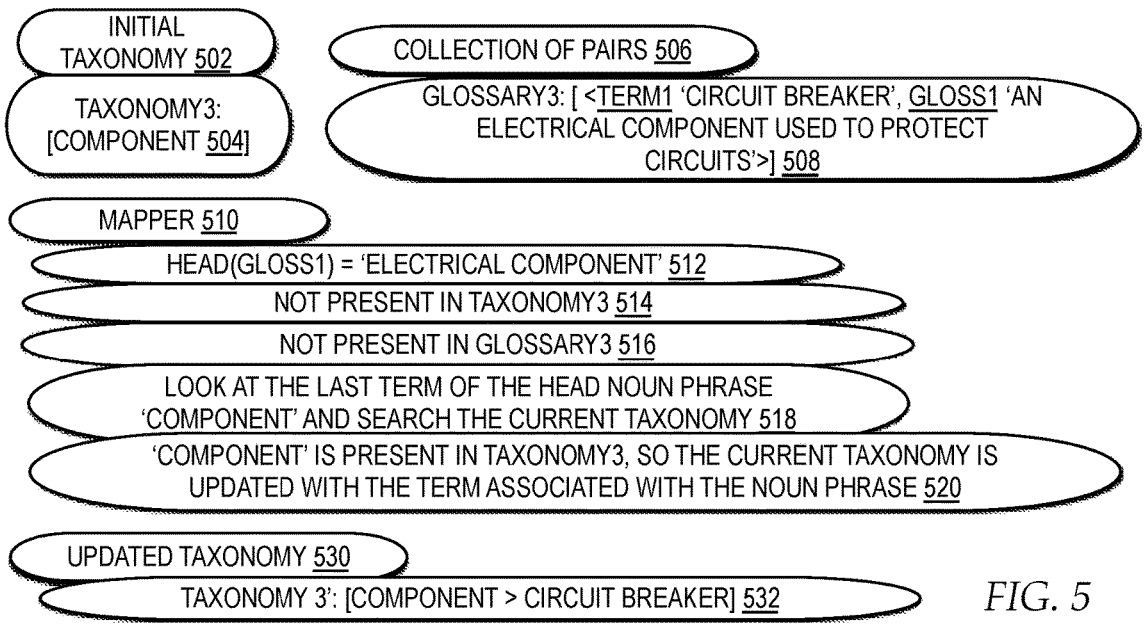
FIG. 5 illustrates a block diagram of one example of a domain extension controller efficiently extending a domain taxonomy based on analyzing a last term of a noun phrase extracted from a glossary definition in a document corpus of the domain.

FIG. 5 illustrates a block diagram of one example of a domain extension controller efficiently extending a domain taxonomy based on analyzing a last term of a noun phrase extracted from a glossary definition in a document corpus of the domain.

In the example, an existing, initial taxonomy 502 includes a taxonomy3 504 with an entry of "component". In the example, pair extractor 218 reviews glossaries within documents in a corpus and collects a collection of pairs 506 with a <term, gloss> pairs from a glossary3 508 of a document of "<term1 'circuit breaker', gloss1 'an electrical component used to protect circuits>'".

In the example, mapper 230 performs multiple mapping functions illustrated by mapping 510. First, as illustrated at reference numeral 512, head word extractor 260 searches "gloss1 'an electrical component used to protect circuits'" in collection of pairs 506 and extracts a noun phrase of "electrical component", to identify a "head(gloss1)" of "electrical component". As illustrated at reference numeral 514, head word extractor 260 identifies that the "head (gloss1)" of "electrical component" is not present in taxonomy3 504, so taxonomy3 504 remains unchanged. In response to identifying that head(gloss1) of "electrical component" is not present in taxonomy3 504, interference controller 262 initiates tiny function 268 to look up the noun phrase of "electrical component" in glossary3 508 to determine if the phrase is in the current glossary. As illustrated at reference numeral 516, tiny function 268 identifies that the noun phrase of "electrical component" is not present in glossary3 508. As illustrated at reference numeral 518, in response to identifying the noun phrase is not present in glossary3 508, interference controller 262 initiates hypothesis function 272 to identify the last term of the noun phrase of "component" and search taxonomy3 504 with the last term of the noun phrase. As illustrated at reference numeral 520, hypothesis function 272 identifies that the last term 'component' is present in taxonomy3 504 and updates taxonomy3 504 with the term associated with the noun phrase of "circuit breaker". In the example, the final updated taxonomy iteration is stored in updated taxonomy 530 is taxonomy3' 532 with entry updated to "component>circuit breaker".

In the example, by automatically determining that the last word of a noun phrase is "component" of a current entry is present in taxonomy3 504 and mapping the term associated with the noun phrase to taxonomy3 504, domain extension controller 130 efficiently extends initial taxonomy 502 based on a glossary definition into updated taxonomy 520, without requiring an exact match to map a term associated with the noun phrase into taxonomy3 504.

Figure 6:
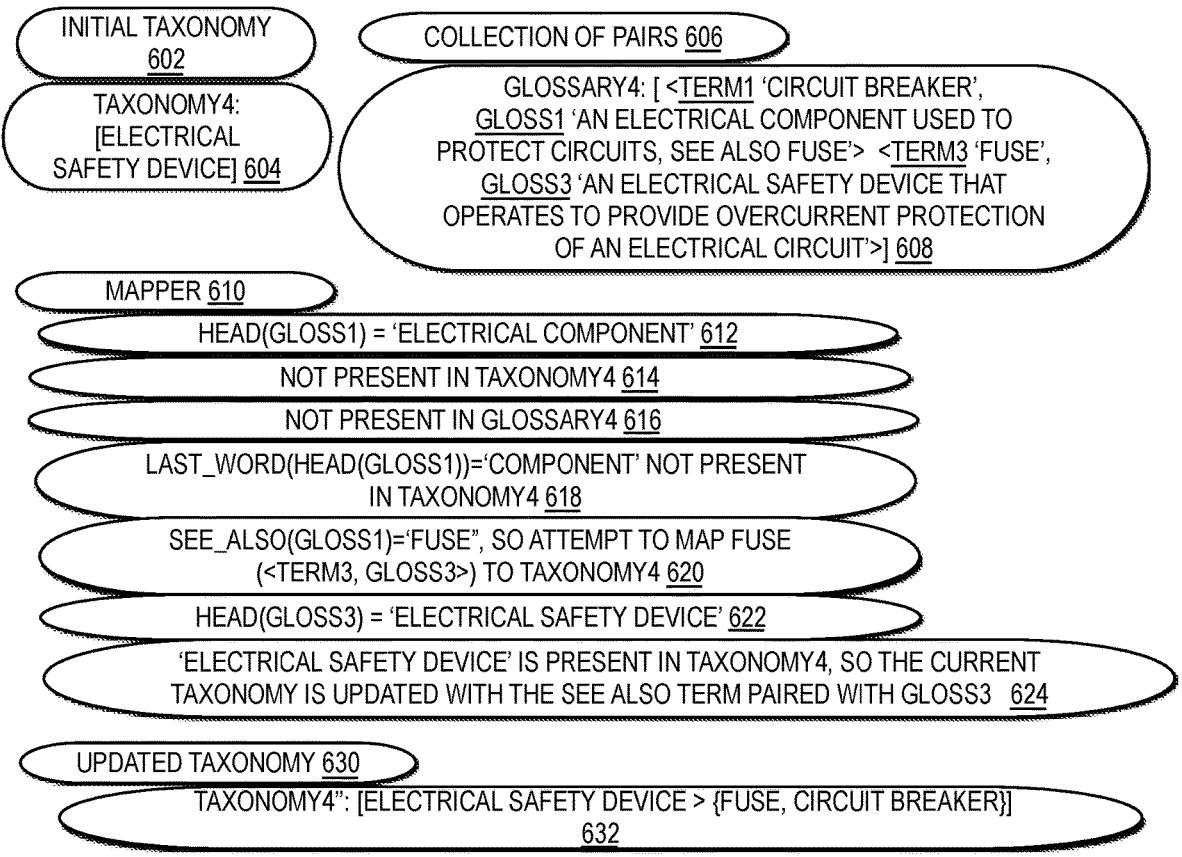
FIG. 6 illustrates a block diagram of one example of a domain extension controller efficiently extending a domain taxonomy based on analyzing a last term of a see also phrase extracted from a glossary definition in a document corpus of the domain.

FIG. 6 illustrates a block diagram of one example of a domain extension controller efficiently extending a domain taxonomy based on analyzing a last term of a see also phrase extracted from a glossary definition in a document corpus of the domain.

In the example, an existing, initial taxonomy 602 includes a taxonomy4 604 with an entry of "electrical safety device". In the example, pair extractor 218 reviews glossaries within documents in a corpus and collects a collection of pairs 606 with a <term, gloss> pairs from a glossary4 608 of a document of "<term1 'circuit breaker', gloss1 'an electrical component used to protect circuits>' and <term3 'fuse', gloss3 'an electrical safety device that operates to provide overcurrent protection of an electrical circuit'>".

In the example, mapper 230 performs multiple mapping functions illustrated by mapping 610. First, as illustrated at reference numeral 612, head word extractor 660 searches "gloss1 'an electrical component used to protect circuits'" in collection of pairs 606 and extracts a noun phrase of "electrical component", to identify a "head(gloss1)" of "electrical component". As illustrated at reference numeral 614, head word extractor 260 identifies that the "head (gloss1)" of "electrical component" is not present in taxonomy4 604, so taxonomy4 604 remains unchanged. In response to identifying that head(gloss1) of "electrical component" is not present in taxonomy4 604, interference controller 262 initiates tiny function 268 to look up the noun phrase of "electrical component" in glossary4 608 to determine if the phrase is in the current glossary. As illustrated at reference numeral 616, tiny function 268 identifies that the noun phrase of "electrical component" is not present in glossary4 608. In response to identifying the noun phrase is not present in glossary4 608, interference controller 262 initiates hypothesis function 272 to identify the last term of the noun phrase of "component" and search taxonomy4 604 with the last term of the noun phrase. As illustrated at reference numeral 618, hypothesis function 272 does not identify that the last term 'component' is present in taxonomy4 604. In response to identifying the last term of the noun phrase is not present in the current taxonomy, interference controller 262 initiates see also function 276.

As illustrated at reference numeral 620, see also function 276 extract see also term from glossary4 608, from "term1" of "see_also(gloss1)='fuse'". See also function 276 identifies that "term3" matches "see_also(gloss1)='fuse'" and attempts to map gloss3 of the <term3, gloss3> pair to taxonomy4 604 by calling head word extractor 260 to extract a noun phrase from "gloss3". As illustrated at reference numeral 622, head word extractor 260 extracts a "head(gloss3)" of "electrical safety device" from "gloss3". As illustrated at reference numeral 624, mapper 230 identifies that the noun phrase of "electrical safety device" is present in taxonomy4 and updates the current taxonomy with the term in the <term1,gloss1> pair including the see also term of 'circuit breaker' and the mapped to see also term of "fuse", mapped to a same node. In the example, the final updated taxonomy iteration stored in updated taxonomy 630 is taxonomy4' 632 with the entry updated to "electrical safety device>{fuse, circuit breaker}>".

Figure 7:
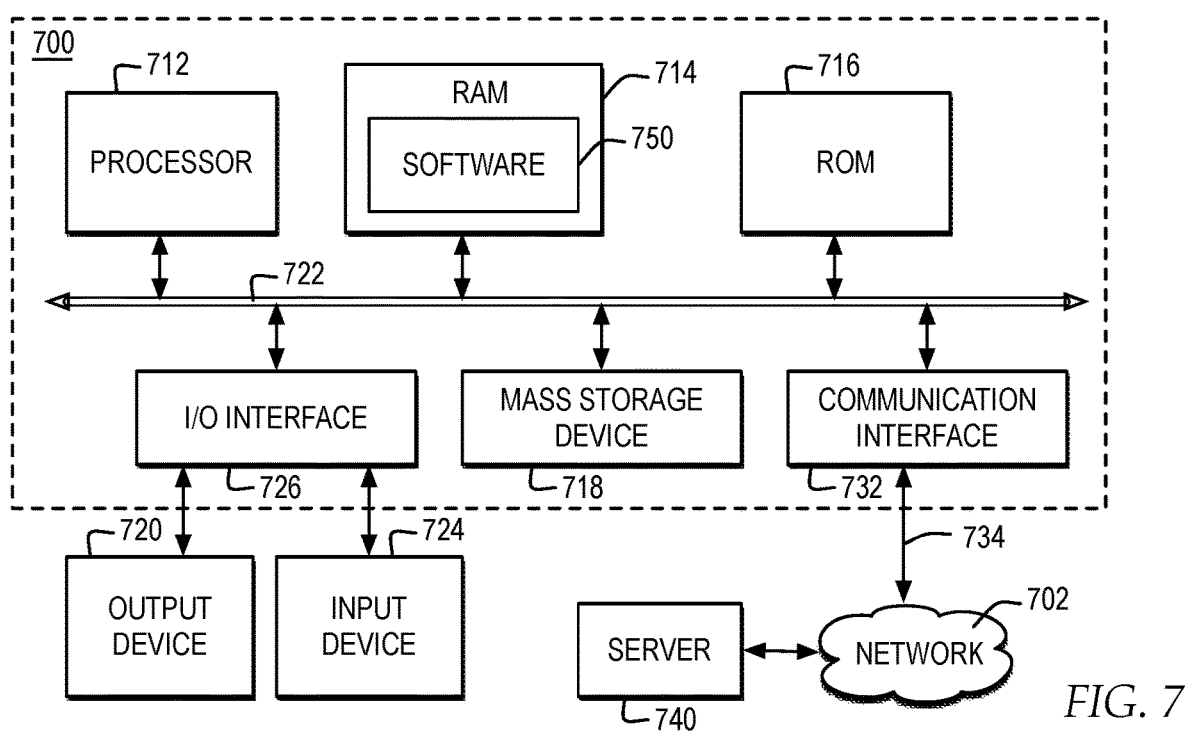
FIG. 7 illustrates one example of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 702, through a communication interface, such as network interface 732, or over a network link that may be connected, for example, to network 702.

In the example, multiple systems within a network environment may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony-based networks, broadcast television networks, local area and wire area networks, public networks, and restricted networks.

Network 702 and the systems communicatively connected to computer 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the world-wide collection of networks and gateways that use the TCP/IP suite of protocols to communicate with one another. Network 702 may implement a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

In one embodiment, the operations performed by processor 712 may control the operations of flowchart of FIGS. 8-14 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowcharts in FIGS. 8-14.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figure 8:
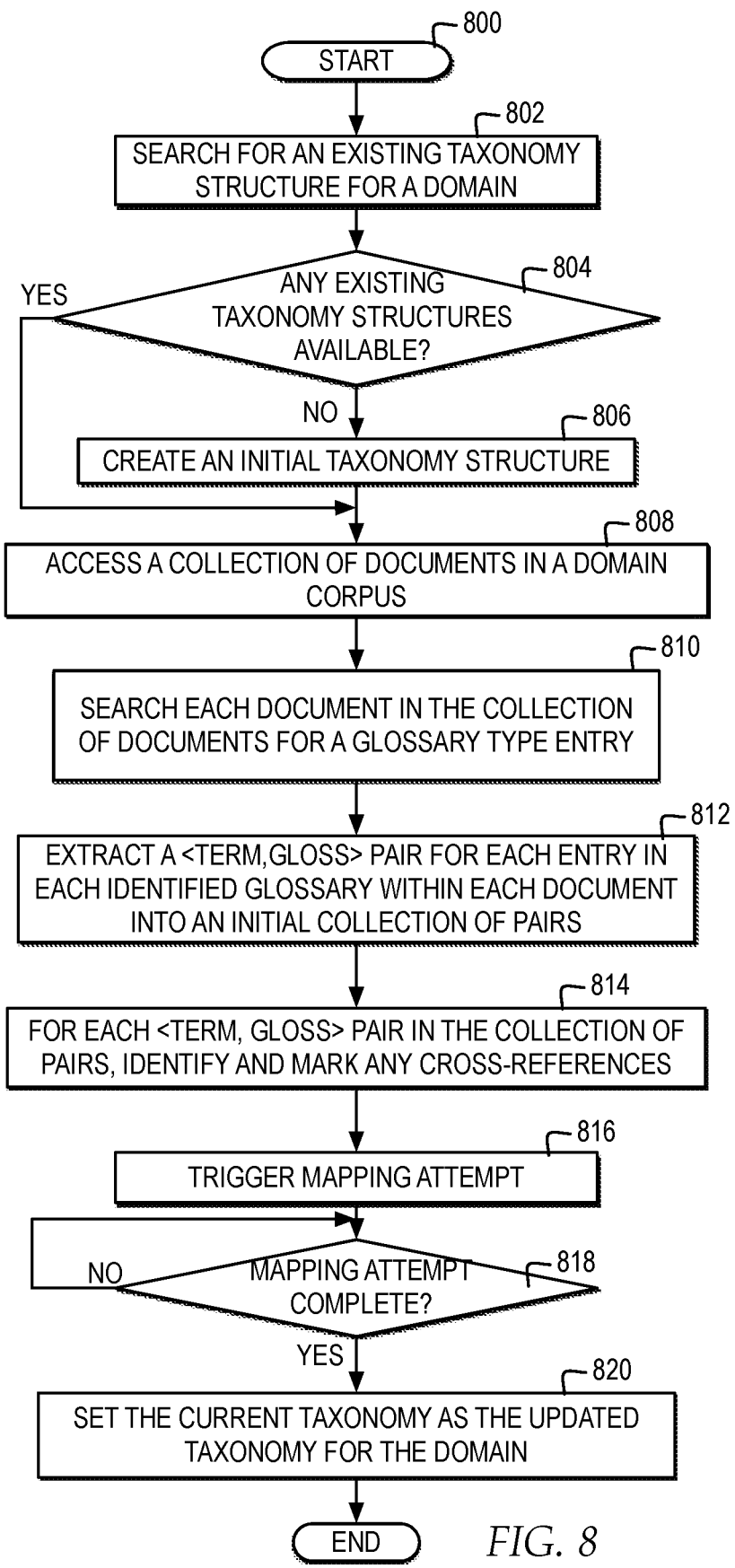
FIG. 8 illustrates a high-level logic flowchart of a process and computer program for collecting term and gloss pairs from glossaries of documents of a domain.

FIG. 8 illustrates a high-level logic flowchart of a process and computer program for collecting term and gloss pairs from glossaries of documents of a domain.

In the example, the process and program starts at block 800 and thereafter proceeds to block 802. Block 802 illustrates searching for an existing taxonomy structure for a domain. Next, block 804 illustrates a determination whether any existing taxonomy structures for a domain are available. At block 804, if no existing taxonomy structures for a domain are available, then the process passes to block 806. Block 806 illustrates creating an initial taxonomy structure, and the process passes to block 808. Returning to block 804, if existing taxonomy structures for domain are available, then the process passes to block 808.

Block 808 illustrates accessing a collection of documents in a domain corpus for the domain. Next, block 810 illustrates searching each document in the collection of documents for a glossary type entry. Thereafter, block 812 illustrates extracting a <term, gloss> pair for each entry in each identified glossary within each document into an initial collection of pairs. Next, block 814 illustrates, for each <term, gloss> pair in the collection of pairs, identifying any cross-references. Thereafter, block 816 illustrates triggering a mapping attempt. Next, block 818 illustrates a determination whether the mapping attempt is complete. At block 818, if the mapping attempt is complete, then the process passes to block 820. Block 820 illustrates setting the current taxonomy as the updated taxonomy for the domain, and the process ends.

Figure 9:
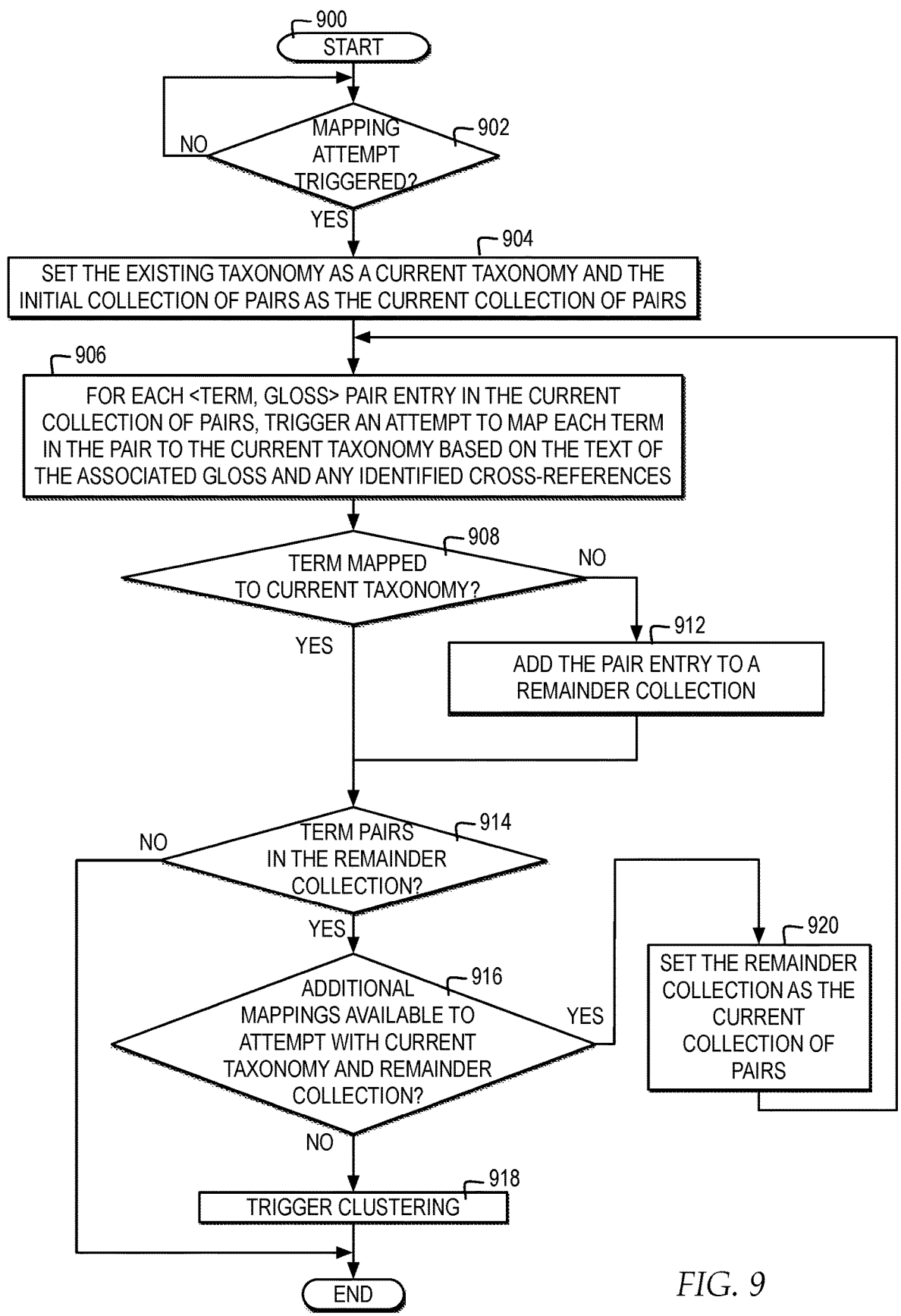
FIG. 9 illustrates a high-level logic flowchart of a process and computer program for attempting to map each <term, gloss> pair into an existing taxonomy to extend the existing taxonomy based on the granularity of categories defined in the <term, gloss> pair.

FIG. 9 illustrates a high-level logic flowchart of a process and computer program for attempting to map each <term, gloss> pair into an existing taxonomy to extend the existing taxonomy based on the granularity of categories defined in the <term, gloss> pair.

In the example, the process and computer program product starts at block 900 and thereafter proceeds to block 902. Block 902 illustrates a determination whether a mapping attempt is triggered. At block 902, if a mapping attempt is triggered, then the process passes to block 904. Block 904 illustrates setting the existing taxonomy as a current taxonomy and the initial collection of pairs as the current collection of pairs. Next, block 906 illustrates, for each <term, gloss> pair entry in the current collection of pairs, triggering an attempt to map each term in the pair to the current taxonomy based on the text of the associated gloss and any identified cross references, and the process passes to block 908.

Block 908 illustrates a determination whether the term maps to the current taxonomy. At block 908, if the term maps to the current taxonomy then the process passes to block 914. Returning to block 908, if the term does not map to the current taxonomy, then the process passes to block 912. Block 912 illustrates adding the pair entry to a remainder collection, and the process passes to block 914.

Block 914 illustrates a determination whether there are any term pairs in the remainder collection. At block 914, if there are not any term pairs in the remainder collection, then the process passes ends. Otherwise, at block 914, if there are term pairs in the remainder collection, then the process passes to block 916.

Block 916 illustrates a determination whether additional mappings are available to attempt with the current taxonomy and remainder collection. At block 916, if there are not additional mappings to attempt with the current taxonomy and remainder collection, then the process passes to block 918. Block 918 illustrates triggering clustering, and the process ends. Otherwise, at block 916, if there are additional mappings to attempt with the current taxonomy and remainder collection, then the process passes to block 918. Block 920 illustrates setting the remainder collection as the current collection of pairs and returning to block 906.

Figure 10:
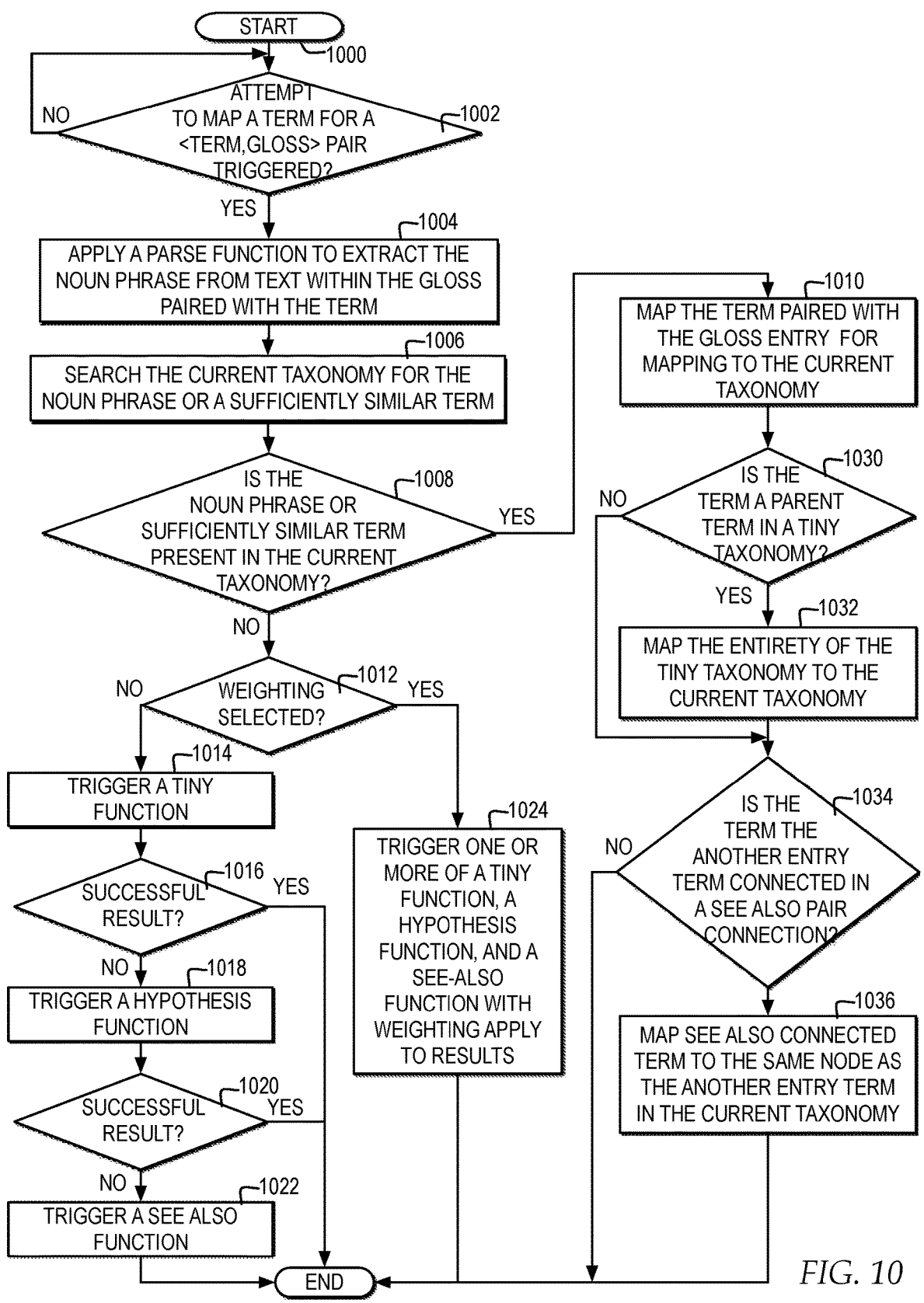
FIG. 10 illustrates a high-level logic flowchart of a process and computer program for attempting to map a term and gloss pair into an existing taxonomy to extend the existing taxonomy based on analyzing different portions of the term and gloss and attempting to map the analyzed portions into the existing taxonomy.

FIG. 10 illustrates a high-level logic flowchart of a process and computer program for attempting to map a term and gloss pair into an existing taxonomy to extend the existing taxonomy based on analyzing different portions of the term and gloss and attempting to map the analyzed portions into the existing taxonomy.

In one example, the process starts at block 1000, and thereafter proceeds to block 1002. Block 1002 illustrates a determination whether an attempt to map a term for a term glass pair is triggered. At block 1002, if an attempt to map a term for a term glass pair is triggered, then the process passes to block 1004. Block 1004 illustrates applying a parse function to extract the noun phrase from text within the gloss paired with the term. Next, block 1006 illustrates searching the current taxonomy for the noun phrase or a sufficiently similar term, and the process passes to block 1008.

Block 1008 illustrates a determination whether the noun phrase or sufficiently similar term is present in the current taxonomy. At block 1008, if the noun phrase or sufficiently similar term is present in the current taxonomy, then the process passes to block 1010. Block 1010 illustrates mapping the term paired with the gloss entry to the current taxonomy as a child node of the term matching the noun phrase or sufficiently similar term in the current taxonomy, and the process passes to block 1030.

Block 1030 illustrates a determination whether the term mapped to the taxonomy is a parent term in a tiny taxonomy. At block 1030, if the term mapped to the taxonomy is not a parent term in a tiny taxonomy, then the process passes to block 1034. At block 1030, if the term mapped to the taxonomy is a parent term in a tiny taxonomy, then the process passes to block 1032. Block 1032 illustrates mapping the entirety of the tiny taxonomy to the current taxonomy, and the process passes to block 1034.

Block 1034 illustrates a determination whether the term is another entry term connected in a see also pair connection. At block 1034, if the term is not another entry term connected in a see also pair connection, then the process ends. At block 1034, if the term is another entry term connected in a see also pair connection, then the process passes to block 1036. Block 1036 illustrates mapping the see also connected term to the same node as the another entry term in the current taxonomy, and the process ends.

At block 1008, if the noun phrase or sufficiently similar term is not present in the current taxonomy, then the process passes to block 1012. Block 1012 illustrates a determination whether weighting is selected. At block 1012, if weighting is selected, then the process passes to block 1024. Block 1024 illustrates triggering one or more of a tiny function, a hypothesis function, and a see also function with weighting applied to the results, and the process ends.

Returning to block 1012, if weighting is not selected, then the process passes to block 1014. Block 1014 illustrates triggering a tiny function. Next, block 1016 illustrates a determination whether a result is successful. At block 1016, if the result is successful, then the process ends. Otherwise, at block 1016, if the result is not successful, then the process passes to block 1018. Block 1018 illustrates triggering a hypothesis function. Next, block 1020 illustrates a determination whether a result is successful. At block 1020, if the result is successful, then the process ends. Otherwise, at block 1020, if the result is not successful, then the process passes to block 1022. Block 1022 illustrates triggering a see also function, and the process ends.

Figure 11:
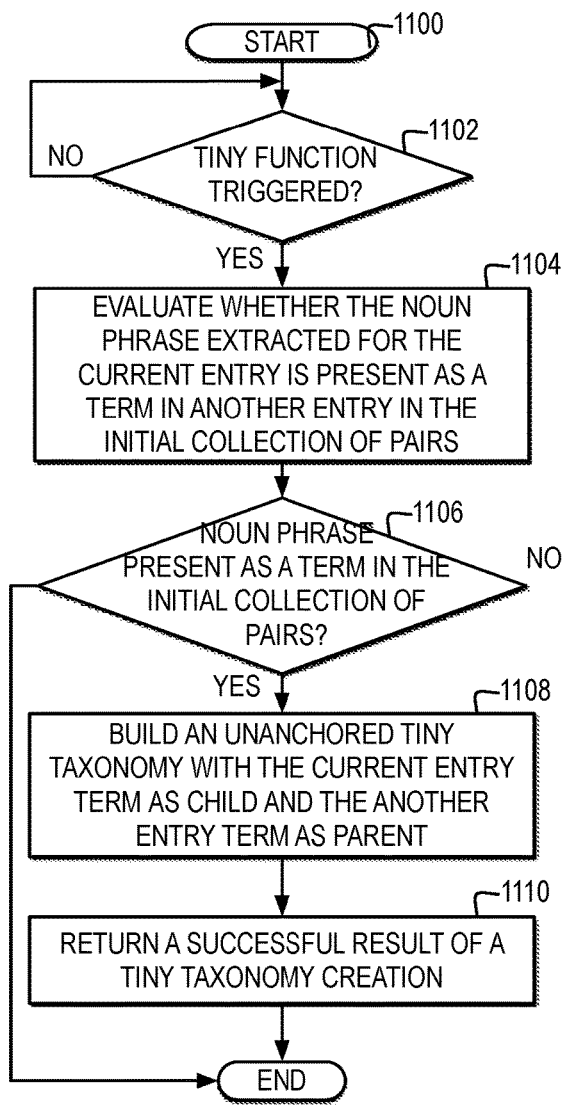
FIG. 11 illustrates a high-level logic flowchart of a process and computer program for applying a tiny function to evaluate whether a noun phrase extracted from a first <term, gloss> pair is present in another <term, gloss> pair in a glossary extracted from one or more documents of a domain corpus to support mapping the first <term, gloss> pair to a current taxonomy for the domain.

FIG. 11 illustrates a high-level logic flowchart of a process and computer program for applying a tiny function to evaluate whether a noun phrase extracted from a first <term, gloss> pair is present in another <term, gloss> pair in a glossary extracted from one or more documents of a domain corpus to support mapping the first <term, gloss> pair to a current taxonomy for the domain.

In the example, the process starts at block 1100 and thereafter proceeds to block 1102. Block 1102 illustrates a determination whether a tiny function is triggered. At block 1102, if a tiny function is triggered, then the process passes to block 1104. Block 1104 illustrates evaluating whether the noun phrase extracted for the current entry is present as a term in another entry in the initial collection of pairs. Next, block 1106 illustrates a determination whether the noun phrase is present as a term in the initial collection of pairs. At block 1106 if the noun phrase is not present as a term in the initial collection of pairs, then the process ends. At block 1106, if the noun phrase is present as a term in the initial collection of pairs, then the process passes to block 1108. Block 1108 illustrates building an unanchored tiny taxonomy with the current entry term as a child node and the another entry term as parent. Next, block 1110 illustrates returning a successfully result of a tiny taxonomy creation, and the process ends.

Figure 12:
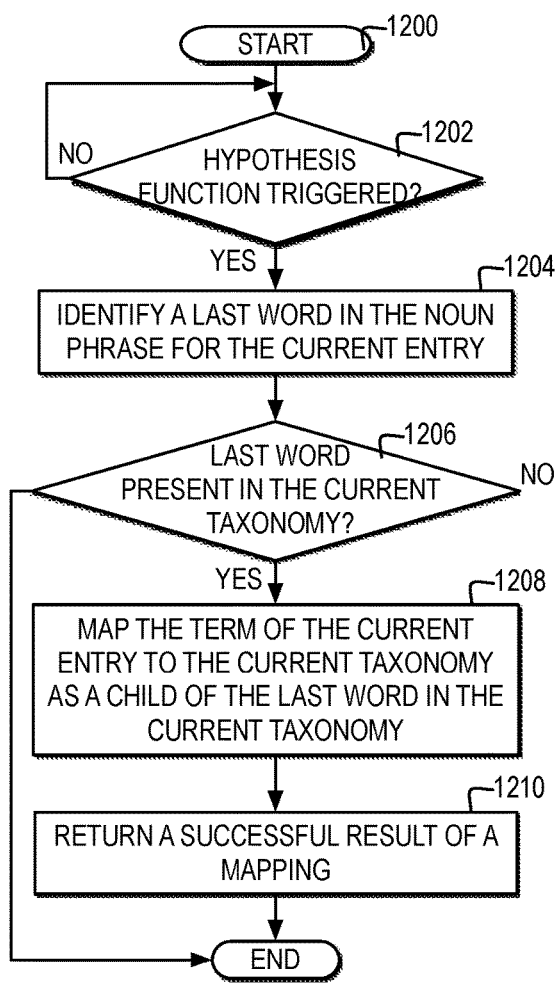
FIG. 12 illustrates a high-level logic flowchart of a process and computer program for applying a hypothesis function to evaluate whether the last word in a noun phrase extracted from a current <term, gloss> pair entry is present in the current taxonomy to support mapping the current <term, gloss> pair to a current taxonomy for the domain.

FIG. 12 illustrates a high-level logic flowchart of a process and computer program for applying a hypothesis function to evaluate whether the last word in a noun phrase extracted from a current <term, gloss> pair entry is present in the current taxonomy to support mapping the current <term, gloss> pair to a current taxonomy for the domain.

In the example, the process and computer program start at block 1200 and thereafter proceed to block 1202. Block 1202 illustrates a determination whether a hypothesis function is triggered. At block 1202, if a hypothesis function is triggered, then the process passes to block 1204. Block 1204 illustrates identifying a last word in the noun phrase for the current entry. Next, block 1206 illustrates a determination the last word is present in the current taxonomy. At block 1206 if the last word is not present in the current taxonomy, then the process ends. At block 1206, if the last word is present in the current taxonomy, then the process passes to block 1208. Block 1208 illustrates mapping the term of the current entry to the current taxonomy as a child node of the last word in the current taxonomy. Next, block 1210 illustrates returning a successfully result of a mapping, and the process ends.

Figure 13:
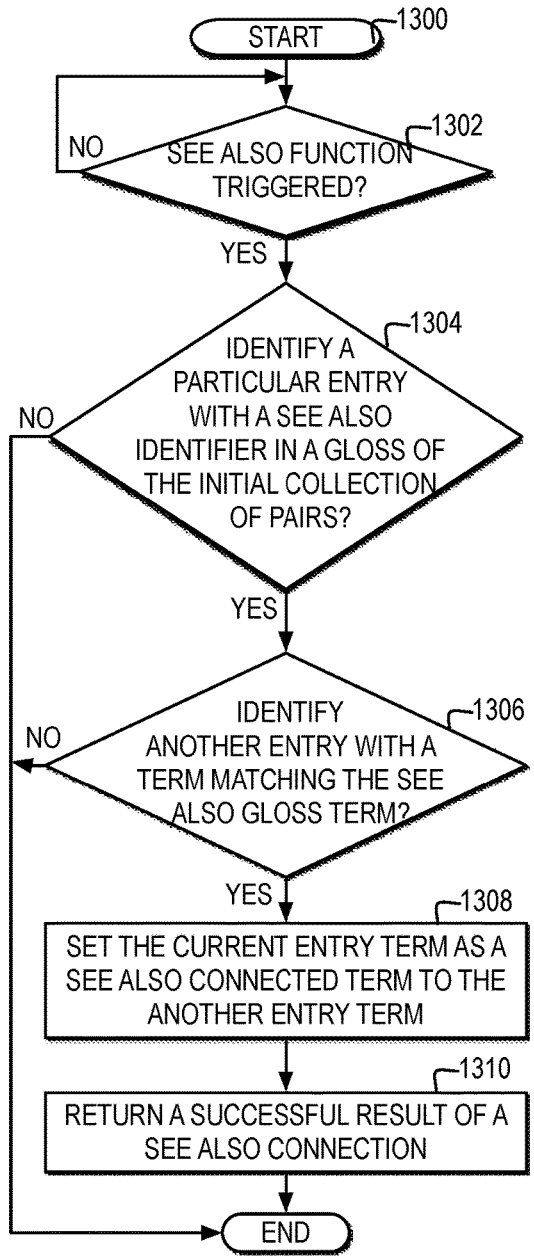
FIG. 13 illustrates a high-level logic flowchart of a process and computer program for applying a see also function to evaluate whether a see also term is present in a current <term, gloss> pair entry to support mapping the current <term, gloss> pair to a current taxonomy for the domain.

FIG. 13 illustrates a high-level logic flowchart of a process and computer program for applying a see also function to evaluate whether a see also term is present in a current <term, gloss> pair entry to support mapping the current <term, gloss> pair to a current taxonomy for the domain.

In the example, the process starts at block 1300 and thereafter proceeds to block 1302. Block 1302 illustrates a determination whether a see also function is triggered. At block 1302, if a see also function is triggered, then the process passes to block 1304. Block 1304 illustrates a determination whether a particular entry with a see also identifier is identified in a gloss of the initial collection of pairs. At block 1304, if a particular entry with a see also identifier is not identified in a gloss of the initial collection of pairs is identified, then the process ends. At block 1304, if a particular entry with a see also identifier is identified in a gloss of the initial collection of pairs is identified, then the process passes to block 1306.

Block 1306 illustrates a determination whether another entry with a term matching the see also gloss term is identified in the initial collection of pairs. At block 1306, if another entry with a term matching the see also gloss term is not identified in the initial collection of pairs, then the process ends. At block 1306, if another entry with a term matching the see also gloss term is identified in the initial collection of pairs, then the process passes to block 1308.

Block 1308 illustrates setting the current entry term as a see also connected term to the another entry term. Next, block 1310 illustrates returning a successful result of a see also connection, and the process ends.

Figure 14:
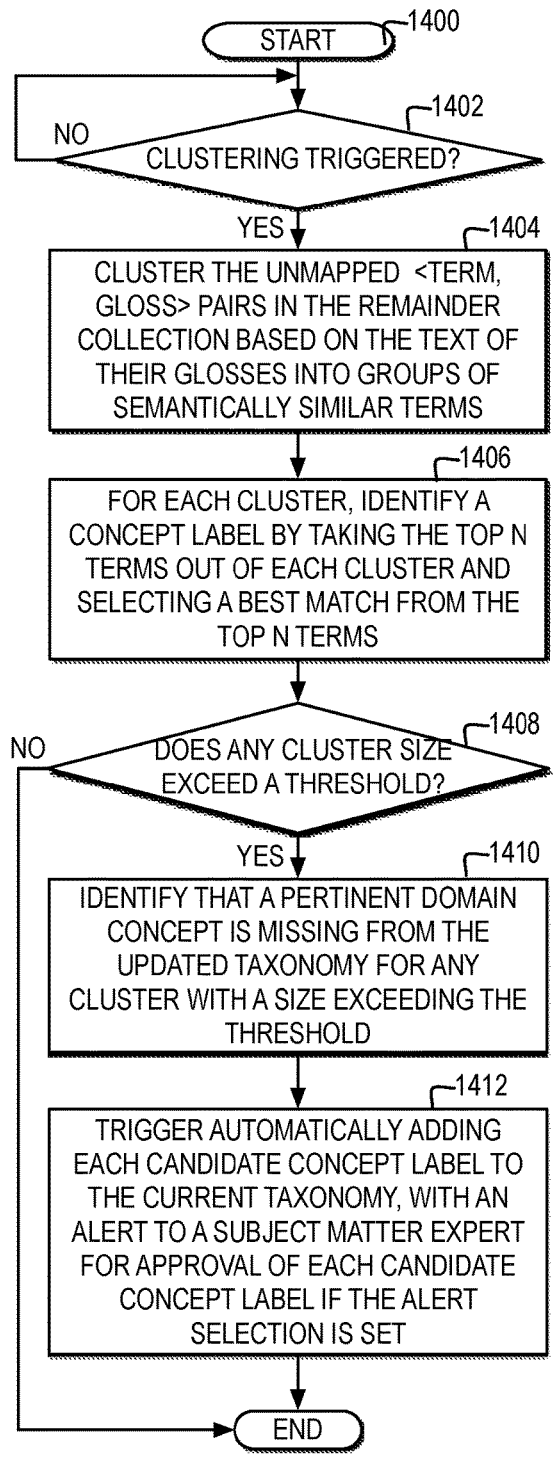
FIG. 14 illustrates a high-level logic flowchart of a process and computer program for analyzing clusters of unmapped <term, gloss> pairs to a current taxonomy and recommending a candidate concept label to add to the current taxonomy for any cluster size exceeding a threshold.

FIG. 14 illustrates a high-level logic flowchart of a process and computer program for analyzing clusters of unmapped <term, gloss> pairs to a current taxonomy and recommending a candidate concept label to add to the current taxonomy for any cluster size exceeding a threshold.

In one example, the process starts at block 1400 and thereafter proceeds to block 1402. Block 1402 illustrates a determination whether clustering is triggered. At block 1402, if clustering is triggered, then the process passes to block 1404. Block 1404 illustrates clustering the unmapped <term, gloss> pairs in the remainder collection based on the text of their glosses into groups of semantically similar terms. Next, block 1406 illustrates, for each cluster, identifying a concept label by taking the top N terms of each cluster and selecting a best match from the top N terms, and the process passes to block 1408.

Block 1408 illustrates a determination whether any cluster size exceeds a threshold. At block 1408, if no cluster size exceeds a threshold, then the process ends. At block 1408, if one or more cluster sizes exceeds a threshold, then the process passes to block 1410. Block 1410 illustrates identifying that a pertinent domain concept is missing from the updated taxonomy for any cluster with a size exceeding the threshold. Next block 1412 illustrates triggering automatically adding each candidate concept label to the current taxonomy, with an alert to a subject matter expert for approval of each candidate concept label if the alert selection is set, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
    applying, by a computer, rule-based annotators and statistical annotators to automate document annotation;
    annotating, by the computer, a plurality of documents in a corpus such that the plurality of documents are recognizable by a machine;
    using, by the computer, annotated documents as a dataset in machine learning for building natural language processing models used in a question answering system in the computer;
    accessing, by the computer, an initial taxonomy for a domain comprising one or more existing terms for the domain identified in a hierarchical structure;
    analyzing, by the computer, the corpus of the plurality of documents for a domain to identify a selection of one or more documents with glossaries;
    extracting, by the computer, from the glossaries, one or more pairs each comprising a term and a definition;
    attempting to map, by the computer, a respective term of each of the one or more pairs into the initial taxonomy for the domain based on text of a respective definition of each of the one or more pairs to generate an updated taxonomy for the domain;
    extracting, by the computer, a head noun phrase of the respective definition of a current entry from among the one or more pairs;
    evaluating, by the computer, whether the head noun phrase is present in the initial taxonomy;
    responsive to the head noun phrase being present in the initial taxonomy, mapping, by the computer, the respective term of the current entry to the initial taxonomy to generate the updated taxonomy;
    responsive to the head noun phrase not being present in the initial taxonomy, evaluating, by the computer, whether the head noun phrase is present in a particular definition from among the one or more pairs;
    responsive to evaluating the head noun phrase is present in the particular definition from among the one or more pairs, building, by the computer, a tiny taxonomy with the respective term of the current entry as a child node and another term paired with the particular definition as the parent node; and
    responsive to mapping the another term to the initial taxonomy to generate the updated taxonomy, mapping, by the computer system, the tiny taxonomy to the updated taxonomy.

2. The method according to claim 1, wherein accessing, by a computer, an initial taxonomy for a domain comprising one or more existing terms for the domain identified in a hierarchical structure further comprises:
    accessing, by the computer, the initial taxonomy comprising the one or more existing terms for the domain identified in the hierarchical structure comprising a parent node and one or more levels of child nodes.

3. The method according to claim 1, wherein attempting to map a respective term of each of the one or more pairs into the initial taxonomy for the domain based on text of a respective definition of each of the one or more pairs to generate an updated taxonomy for the domain further comprises:
    marking, by the computer, one or more selections of the one or more pairs that are related; and
    attempting to map, by the computer, the respective term of each of the one or more pairs into the initial taxonomy for the domain based on text of the respective definition of each of the one or more pairs and the marked one or more selections of the one or more pairs that are related to generate the updated taxonomy for the domain.

4. The method according to claim 1, further comprising: responsive to the head noun phrase not being present in the initial taxonomy, evaluating, by the computer, whether a last word of the head noun phrase is present the initial taxonomy; and responsive to evaluating the last word of the head noun phrase is present in the initial taxonomy, mapping, by the computer, the respective term of the current entry to the updated taxonomy.

5. The method according to claim 1, further comprising: responsive to the head noun phrase not being present in the initial taxonomy, evaluating, by the computer, whether a see also term is present in a particular definition of another entry from among the one or more pairs; responsive to detecting the see also term in the particular definition of the another entry, attempting to map, by the computer system, the another entry to the initial taxonomy to generate the updated taxonomy; and responsive to mapping the another entry to the initial taxonomy to generate the updated taxonomy, mapping the current entry to a same node as the another entry in the updated taxonomy.

6. The method according to claim 1, further comprising:
identifying, by the computer, a remainder collection of one or more unmapped pairs from among the plurality of pairs that are not mapped to generate the updated taxonomy; and
clustering, by the computer, one or more clusters from among the one or more unmapped pairs based on the text of the respective definition of each of the one or more unmapped pairs into one or more groups of semantically similar terms.

7. The method according to claim 1, wherein attempting to map, by the computer, a respective term of each of the one or more pairs into the initial taxonomy for the domain based on text of a respective definition of each of the one or more pairs to generate an updated taxonomy for the domain further comprises:
identifying, by the computer, a remainder collection of one or more unmapped pairs from among the plurality of pairs that are not mapped to generate the updated taxonomy; and
iteratively attempting to map, by the computer, the remainder collection of the one or more unmapped pairs to the updated taxonomy based on the text of the respective definition of the one or more unmapped pairs.

8. The method according to claim 6, further comprising:
evaluating, by the computer, a top N terms from each of the one or more clusters;
selecting, by the computer, a best match term from each selection of top N terms as a candidate concept label for the respective cluster from the one or more clusters; and
automatically adding, by the computer, each candidate concept label to the initial taxonomy to generate the updated taxonomy.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instruction to apply rule-based annotators and statistical annotators to automate document annotation;
program instructions to annotate a plurality of documents in a corpus such that the plurality of documents are recognizable by a machine;
program instructions to use annotated documents as a dataset in machine learning for building natural language processing models used in a question answering system in the computer system;
program instructions to access an initial taxonomy for a domain comprising one or more existing terms for the domain identified in a hierarchical structure;
program instructions to analyze the corpus of the plurality of documents for a domain to identify a selection of one or more documents with glossaries;
program instructions to extract, from the glossaries, one or more pairs each comprising a term and a definition;
program instructions to attempt to map a respective term of each of the one or more pairs into the initial taxonomy for the domain based on text of a respective definition of each of the one or more pairs to generate an updated taxonomy for the domain;
program instructions to extract a head noun phrase of the respective definition of a current entry from among the one or more pairs;
program instructions to evaluate whether the head noun phrase is present in the initial taxonomy;
program instructions, responsive to the head noun phrase being present in the initial taxonomy, to map the respective term of the current entry to the initial taxonomy to generate the updated taxonomy;
program instructions, responsive to the head noun phrase not being present in the initial taxonomy, to evaluate whether the head noun phrase is present in a particular definition from among the one or more pairs;
program instructions, responsive to evaluating the head noun phrase is present in the particular definition from among the one or more pairs, to build a tiny taxonomy with the respective term of the current entry as a child node and another term paired with the particular definition as the parent node; and
program instructions, responsive to mapping the another term to the initial taxonomy to generate the updated taxonomy, to map the tiny taxonomy to the updated taxonomy.

10. The computer system according to claim 9, the program instructions to access an initial taxonomy for a domain comprising one or more existing terms for the domain identified in a hierarchical structure further comprising:
program instructions to access the initial taxonomy comprising the one or more existing terms for the domain identified in the hierarchical structure comprising a parent node and one or more levels of child nodes.

11. The computer system according to claim 9, the program instructions to attempt to map a respective term of each of the one or more pairs into the initial taxonomy for the domain based on text of a respective definition of each of the one or more pairs to generate an updated taxonomy for the domain further comprising:
program instructions to mark one or more selections of the one or more pairs that are related; and
program instructions to attempt to map the respective term of each of the one or more pairs into the initial taxonomy for the domain based on text of the respective definition of each of the one or more pairs and the marked one or more selections of the one or more pairs that are related to generate the updated taxonomy for the domain.

12. The computer system according to claim 9, further comprising: program instructions, responsive to the head noun phrase not being present in the initial taxonomy, to evaluate whether a last word of the head noun phrase is present the initial taxonomy; and program instructions, responsive to evaluating the last word of the head noun phrase is present in the initial taxonomy, to map the respective term of the current entry to the updated taxonomy.

13. The computer system according to claim 9, further comprising: program instructions, responsive to the head noun phrase not being present in the initial taxonomy, to evaluate whether a see also term is present in a particular definition of another entry from among the one or more pairs; program instructions, responsive to detecting the see also term in the particular definition of the another entry, to attempt to map the another entry to the initial taxonomy to generate the updated taxonomy; and program instructions, responsive to mapping the another entry to the initial taxonomy to generate the updated taxonomy, to map the current entry to a same node as the another entry in the updated taxonomy.

14. The computer system according to claim 9, the program instructions to attempt to map a respective term of each of the one or more pairs into the initial taxonomy for the domain based on text of a respective definition of each of the one or more pairs to generate an updated taxonomy for the domain further comprising:
program instructions to identify a remainder collection of one or more unmapped pairs from among the plurality of pairs that are not mapped to generate the updated taxonomy; and
program instructions to iteratively attempt to map the remainder collection of the one or more unmapped pairs to the updated taxonomy based on the text of the respective definition of the one or more unmapped pairs.

15. The computer system according to claim 9, further comprising:
program instructions to identify a remainder collection of one or more unmapped pairs from among the plurality of pairs that are not mapped to generate the updated taxonomy; and
program instructions to cluster one or more clusters from among the one or more unmapped pairs based on the text of the respective definition of each of the one or more unmapped pairs into one or more groups of semantically similar terms.

16. A computer program product comprises one or more computer readable storage media having program instructions collectively stored thereon, wherein the one or more computer readable storage media are not a transitory signal per se, the program instructions executable by a computer to cause the computer to:
apply, by a computer, rule-based annotators and statistical annotators to automate document annotation;
annotate, by a computer, a plurality of documents in a corpus such that the documents are recognizable by a machine;
use, by the computer, annotated documents as a dataset in machine learning for building natural language processing models used in a question answering system in the computer;
access, by the computer, an initial taxonomy for a domain comprising one or more existing terms for the domain identified in a hierarchical structure;
analyze, by the computer, the corpus of the plurality of documents for a domain to identify a selection of one or more documents with glossaries;
extract, by the computer, from the glossaries, one or more pairs each comprising a term and a definition;
attempt to map, by the computer, a respective term of each of the one or more pairs into the initial taxonomy for the domain based on text of a respective definition of each of the one or more pairs to generate an updated taxonomy for the domain;
extract, by the computer, a head noun phrase of the respective definition of a current entry from among the one or more pairs;
evaluate, by the computer, whether the head noun phrase is present in the initial taxonomy;
responsive to the head noun phrase being present in the initial taxonomy, map, by the computer, the respective term of the current entry to the initial taxonomy to generate the updated taxonomy;
responsive to the head noun phrase not being present in the initial taxonomy, evaluate, by the computer, whether a head noun phrase is present in a particular definition from among the one or more pairs;
responsive to evaluating the head noun phrase is present in the particular definition from among the one or more pairs, build, by the computer, a tiny taxonomy with the respective term of the current entry as a child node and another term paired with the particular definition as the parent node; and
responsive to mapping the another term to the initial taxonomy to generate the updated taxonomy, map, by the computer, the tiny taxonomy to the updated taxonomy.

* * * * *